United States Patent [19]

Thorsell et al.

[11] Patent Number: 4,670,098

[45] Date of Patent: Jun. 2, 1987

[54] PROCESS FOR PREPARING CELLULOSE PULP FROM LIGNOCELLULOSIC MATERIAL WHILE REMOVING HIGH MOLECULAR WEIGHT SUBSTANCES FROM THE PULPING LIQUOR

[75] Inventors: Leif U. F. Thorsell, Domsjo; Nils O. Nilsson, Sjalevad, both of Sweden

[73] Assignee: Mo och Domsjo AB, Ornskoldsvik, Sweden

[21] Appl. No.: 812,430

[22] Filed: Dec. 23, 1985

[51] Int. Cl.⁴ .................... D21C 3/02; D21C 3/06; D21C 11/00; D21C 11/02

[52] U.S. Cl. ..................................... 162/29; 162/36; 162/42; 162/82; 162/83

[58] Field of Search ............... 162/16, 36, 83, 82, 162/42, 29, 43

[56] References Cited

U.S. PATENT DOCUMENTS 2,683,090   7/1954   Alfred et al. ..................... 162/42

OTHER PUBLICATIONS

Wayman et al., "Separation of Sugars and Lignin in Spent Pulping Liquor by Hydrolysis and Ultrafiltration" *TAPPI*, vol. 59, No. 3 (3-1976).

Collins et al., "Spent Sulfite Liquor Reducing Sugar Purification by Ultrafiltration with Dynamic Membranes" *TAPPI*, vol. 56, No. 6 (6-1973).

*Primary Examiner*—Steve Alvo

[57] ABSTRACT

A process is provided for preparing cellulose pulp by delignification of lignocellulosic material, which comprises subjecting particulate lignocellulosic material in a pulping zone to the pulping action of a pulping liquor at a temperature at which pulping reactions leading to formation of cellulose pulp proceed, and substances having a molecular weight above about 3500, preferably above about 2000, and preferably above about 1500, are physically separated and removed from the lignocellulosic material and become dispersed in the pulping liquor; in the course of the pulping, withdrawing pulping liquor containing such dispersed substances, and removing such dispersed substances therefrom; and then returning the pulping liquor to the pulping zone.

17 Claims, 2 Drawing Figures

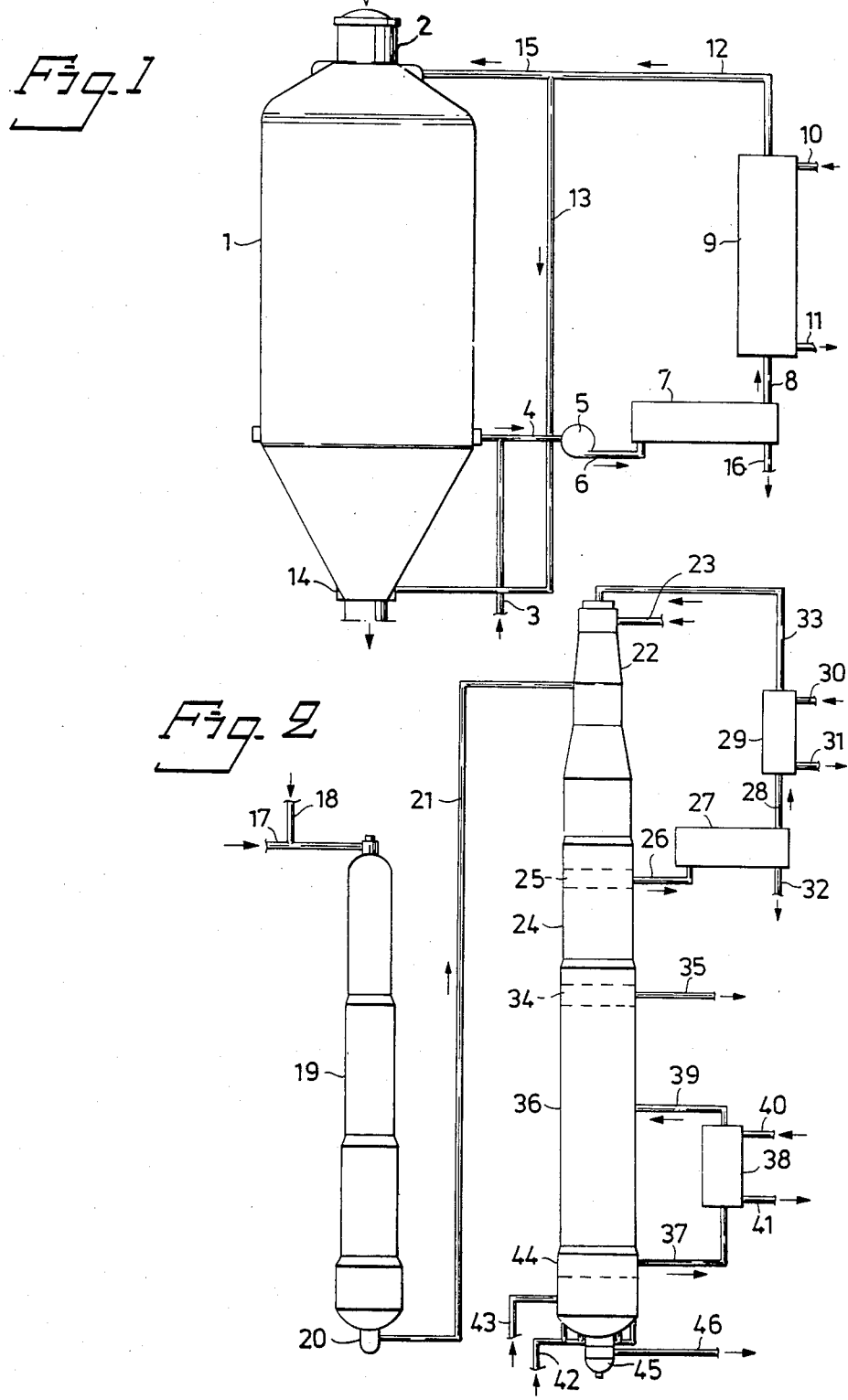

PROCESS FOR PREPARING CELLULOSE PULP FROM LIGNOCELLULOSIC MATERIAL WHILE REMOVING HIGH MOLECULAR WEIGHT SUBSTANCES FROM THE PULPING LIQUOR

Lignocellulosic material is converted to cellulose pulp by the chemical action of pulping liquor, and in the course of the pulping the lignocellulosic material is delignified to an extent which is dependent partly on the pulping conditions and the kind of wood, and partly on the pulping liquor that is employed. In some cases, the delignification is controlled according to the end use of the cellulose pulp.

When pulping hardwood by sulfate pulping liquor, and the cellulose pulp is intended for use in the manufacture of paper pulp, the degree of delignification is carried to a stage where the cellulose pulp has a Kappa number of about 20; when softwood is pulped using sulfate pulping liquor, the delignification is carried to a Kappa number of about 30 to 35. If the pulp is intended for use in the manufacture of liners or cardboard, the wood is delignified to a lesser extent, to a Kappa number within the range from about 65 to about 100. A sulfate pulping liquor normally contains sodium hydroxide and sodium sulphide as the base.

The sulfite method utilizes a sodium or calcium sulfite and/or bisulfite as the base, and is normally carried out not only in one pulping stage but also in two or three stages, in contrast to sulfate pulping, where only one pulping stage is used. Single-stage sulfite pulping is used to produce highly refined pulps, such as dissolving pulps. Two-stage pulpings are applied in the manufacture of paper pulps.

The degree of delignification when pulping by sulfite pulping liquors is partly contingent on the base present. Sulfite pulping liquors can utilize sodium sulfite, sodium bisulfite, magnesium sulfite, ammonium sulfite, calcium sulfite and calcium bisulfite, and mixtures thereof. When using a sodium sulfite or bisulfite, the wood is pulped to a Kappa number of from about 6 to about 10. The lignin content is normally higher when using magnesium sulfite or bisulfite, the pulping being carried to a Kappa number of about 15.

Whatever the pulping method used, the delignification is carried to the optimum Kappa number for the pulping process, and the desired cellulose pulp properties. A high degree of selectivity is sought in all cases, that is, a high viscosity and/or a high pulp yield at given lignin content. It is also desired to remove as much lignin as possible during the pulping, while achieving acceptable pulp properties, so as to decrease the use of environmentally-harmful bleaching chemicals, such as chlorine bleaches, for example.

It has now been found possible to carry the delignification of the lignocellulosic material further, to a higher degree than previously possible, without impairing selectivity, while at the same time improving pulp yield, and with a greater efficiency in the use of the pulping chemicals, if substances having a molecular weight above about 3500, preferably above about 2000, and more preferably above about 1500, are physically separated and removed from the pulping liquor in the course of the pulping reactions. In the course of the pulping, substances having a molecular weight above about 3500 are physically separated and removed from the lignocellulosic material, and become dispersed in the pulping liquor. These substances apparently adversely affect the pulping reactions, so that their removal makes it possible to carry the delignification further, without impairing selectivity, and also improving pulp yield. At the same time, the pulping chemicals are utilized with greater efficiency, making it possible to reduce the amount of pulping chemicals required to obtain a given lignin content in the resulting cellulose pulp.

Accordingly, in accordance with the present invention, a process is provided for preparing cellulose pulp by delignification of lignocellulosic material which comprises:

(1) subjecting particulate lignocellulosic material in a pulping zone to the pulping action of a pulping liquor at a temperature at which pulping reactions leading to formation of cellulose pulp proceed, and substances having a molecular weight above about 3500, preferably above about 2000, and more preferably above about 1500, are removed and become dispersed in the pulping liquor;

(2) in the course of the pulping of step (1) withdrawing pulping liquor containing such dispersed substances from the pulping zone, and physically separating and removing such dispersed substances therefrom; and (3) returning pulping liquor having a substantially reduced amount of such dispersed substances to the pulping zone for further pulping.

The withdrawal of pulping liquor from the pulp can be carried out continuously throughout the process. It is of particular benefit to initiate withdrawal of the pulping liquor and removal of the substances having a molecular weight above about 3500 subsequent to the initial phase of the delignification, in a stage at which the initial pulping reactions are decreasing, and upon commencement of the bulk delignification phase of the pulping.

It is well known that pulping reactions proceed in a series of stages. Initially, the lignocellulosic material is heated up with the pulping liquor at a selected rate of increase of temperature, and the pulping reactions begin. Certain reactions not involving delignification take place at low temperatures, while other reactions including delignification commence as the maximum digestion temperature or range is approached. The initial phase of the pulping reactions can be defined as the phase during which the temperature of the pulping liquor is still increasing, and the selected (usually, maximum) pulping temperature has not yet been reached, before delignification has begun. Eventually, the selected pulping temperature or range of temperature is reached, and the pulping then continues at this temperature or within this range for a selected time, according to the wood, the pulping liquor, and the properties of the desired cellulose pulp. At the end of the initial phase, the initial pulping reactions start to decrease, and the pulping reactions responsible for the greater part of the delignification begin, and continue until pulping is complete. This main phase of the pulping is referred to as the bulk delignification phase.

The substances having a molecular weight about 3500 are formed in the part during the initial pulping reaction, but in greater part during the bulk delignification phase. Consequently, while it is advantageous to begin withdrawing the pulping liquor from the pulping zone at the start of the process, the greatest benefit from the withdrawal is obtained during the bulk delignification phase, and therefore the withdrawal need not begin until then.

The withdrawal of pulping liquors can of course be intermittent, from time to time, at spaced intervals, or continuous, but in either case continues at a rate sufficient to maintain a low concentration in the pulping liquor of the high molecular weight substances, so that the concentration of high molecular weight substances in the pulping liquor in the pulping zone remains below about 8% by weight of the pulping liquor, and preferably below about 5%. Optimum results are obtained at a concentration within the range from about 0.5 to about 2.5% by weight of the pulping liquor.

The drawings represent flow sheets showing application of the process of the invention.

FIG. 1 is a flow sheet showing application of the process of the invention in a batchwise pulping process; and FIG. 2 is a flow sheet showing application of the process of the invention in a continuous pulping process.

The flow sheet of FIG. 1 shows application of the process to a sulfite pulping, using a batch sulfite digester 1. Wood chips are introduced into the digester 1 at the top through the inlet 2 until the digester is filled to a desired level. Fresh cooking liquor is introduced into the digester through the inlet line 3, which feeds the liquor via line 4 to the pump 5, whence it is pumped via line 6 into the separator 7, where the high molecular weight substances are removed from the pulping liquor in the course of the process. Pulping liquor then passes to the heat exchanger 9 via line 8, and the cooking liquor is heated to the selected pulping temperature, which is maintained until the end of the pulping process. The heat exchanger is provided with high pressure steam, entering via line 10, for heating the pulping liquor. Condensed water and surplus steam are removed through the line 11. The cooking liquor then is fed via line 12 to the feed lines 13 and 15, feeding the liquor to the bottom of the digester 1 and the top of the digester 1, respectively.

When the wood chips in the digester are brought into contact with the heated pulping liquor, the pulping reactions begin. First, the wood chips are penetrated by the hot pulping liquor, and at the same time the pulping liquor is diluted with the water contained in the chips. As the chips become heated by the pulping liquor, the initial pulping reactions begin. In this stage, practically no lignin is released. It is primarily other components in the wood that become dissolved or dispersed in the pulping liquor. The chips eventually reach the selected pulping temperature, at or slightly below the maximum pulping temperature selected, and at this stage the initial pulping reactions begin to decrease while the actual or true delignification reactions proceed more rapidly.

This is the beginning of the bulk delignification phase, and the circulation of pulping liquor through the separator 7 is begun, the pulping liquor being wthdrawn via line 4, and returned after reheating via lines 13 and 15 to the digester 1.

The separator contains a membrane (not shown) which separates from the liquor those high molecular weight substances having a molecular weight above about 1500, which do not pass through the membrane. The material not passing through the membrane is withdrawn from the vessel 7 via the line 16. The pulping liquor passes through the membrane, and is withdrawn via line 8 to the heat exchanger.

The physical separation is more certain with respect to molecular size and completeness than a chemical reaction such as complex formation followed by separation, since chemical reactions are not molecular-weight selective, and moreover are usually incomplete unless the end product is removed as it is formed, while the physical separation is specifically according to molecular size. The physical separation mechanism can be ultrafiltration or reverse osmosis, using a membrane in either case. The membrane is capable of separating the high molecular weight substances having a molecular weight in excess of 3500, preferably as low as 2000, and more preferably as low as 1500, in the optimum embodiment of the process, but the advantages of the invention are usually obtained when the only material removed has a molecular weight above about 3500.

The separator membranes can be any of four types, which are classified according to structure, referred to as homogenous, asymmetric, composite, and dynamic membranes.

The membrane should be resistant to deterioration or destruction at the temperature of the pulping liquor, since, although it is possible to cool the liquor before filtration or osmosis, it is economically disadvantageous to do so, since the liquor then has to be heated up again upon return to the pulping stage. Therefore, the membrane should withstand temperatures within the range from about 50° to about 190° C., the maximum being determined by the selected temperature of the pulping liquor being processed.

One example of a suitable commercially available membrane is the multichannel ceramic membranes sold under the tradename MEMBRALOX. These are made of porous $\alpha$-alumina, with a pore diameter of about 15 $\mu$M, and a number of parallel channels several mm in diameter, supporting a $\gamma$-alumina membrane with pore diameters of from 40 Å to 1000 Å, covering the inner surface of each channel in the support, and bonded thereto by ceramic bonds. The filtrate flows through the channels and the membrane, and the unfiltered pulping liquor flows only through the channels, and is recovered with the high molecular weight substances, while the filtrate is recycled to the pulping stage for reuse, now with a substantially reduced and even substantially zero content of such substances. See the brochure MEMBRALOX distributed by CERAVER, B.P. 113, 65001 Tarbes Cedex, France.

Another type of membrane has a support of sintered coal, carrying a membrane coating of metallic oxide, such as $\alpha$- or $\gamma$-alumina.

These membranes can be arranged in the separator in any conventional way. They can, for example, be in the form of sheets or tubes of the membrane material, arranged in modules thereof, with the pulping liquor withdrawn from the digester on one side of the membrane, the pulping liquor with a reduced content of or zero high molecular weight material passing through and recovered as filtrate from the other side of the membrane, and passing to the heat exchanger 9. Pulping liquor containing high molecular weight substances not passing through the membrane can be separated and sent for example to the pulping waste liquor recovery plant.

Examples of separators which can be employed include tubular modules, sheet modules, helical molecules and hollow fiber modules, but tube modules and plate modules are preferred.

One preferred embodiment of the separator 7 may incorporate, for example, a tube module comprising a plurality of tubes, connected in series or in parallel, with a diameter within the range from about 10 to about 25 mm, and a length within the range from about 2 to about 3 meters. A preferred embodiment of plate modules comprises a plurality of plates arranged successively in series.

In the tube modules, the tubes are disposed within a housing, and the major part of the pulping liquor withdrawn from the digester is forced by the pump 5 under pressure through the membrane tubes. The material which passes through the membranes is designated the "filtrate" or "permeate" and is collected in the surrounding housing, in the space between the membrane and the housing, whence it is conducted through the line 8 to the heat exchanger 9. That part of the pulping liquor in the center of the membrane tubes that does not pass through the membranes is removed through the conduit 16 and is designated the "concentrate".

The type of membrane material employed determines the materials which pass through. The membrane must of course be nonpermeable to the high molecular weight substances, i.e., those having a molecular weight above about 3500, preferably above about 2000, and more preferably above about 1500. The permeability of membranes is determined partly by the membrane pore size and partly by the molecular weight and the configuration of the permeating molecule. Some membranes are more permeable to straight chain molecules and others to branched chain molecules, or molecules having a globular or other spatial configuration. Such membranes are conventionally characterized according to their ability to differentiate between substances of given molecular weight and form, all of this being known and conventional, and therefore no part of the present invention.

The concentrate, composed of the higher molecular weight substances that do not pass through the membrane, is discharged from the conduit 16 of the separator 7, and contains mostly lignin materials and/or decomposition products thereof, of various and unknown structures. The concentrate can be used in various ways. It can for example be burned to recover the inorganic substances and remove the organic substances. Alternatively, it can be collected and subjected to chemical treatment for use in the manufacture of products other than cellulose pulp, for example, lignin derivatives. The concentrate is, for example, useful in the preparation of additives in the manufacture of concrete, adhesives, and similar materials. In such cases, the solids content of the concentrate is recovered by evaporation and spray drying processes.

Since it is primarily lignin constituents and/or decomposition products thereof that constitute the substances having a molecular weight above about 3500, preferably above about 2000, and more preferably above about 1500, and since the wood is not delignified to any great extent during the initial pulping reactions, as indicated previously, the withdrawal of the pulping liquor and operation of the separator 7 is preferably first initiated at the time the initial pulping reactions are starting to decrease, and when the bulk delignification reactions begin.

To facilitate this, a branch conduit can be inserted between the conduits 6 and 8, bypassing separator 7. These conduits can be equipped with valves, on either side of separator 7, and when the optimum moment for initiating the pulping liquor withdrawal and separation stage of the process of the invention is determined, the valves are opened, to the degree required precisely and readily control the amount of the circulating pulping liquor to pass through the separator 7, the remainder bypassing the separator 7.

It may also be desirable, from the standpoint of ease of operation of the process, to initiate withdrawal and circulation of the pulping liquor through the separator 7 at the start of the pulping reactions. In this case, the pulping liquor is treated for removal of the high molecular weight substances right from the beginning of the pulping process, and this is continued through the pulping process until the pulping is concluded.

The drawing shows only one digester, but it will of course be understood that in a batch process a plurality of digestion vessels 1 may be employed, and in this case, all digesters can be connected to the separator 7, and the pulping liquors from all digesters combined and cleaned from high molecular weight substances, and then returned.

It is also possible to withdraw pulping liquor from one digester, clean it, and then return it to another digester.

With the introduction of valves in lines 6 and 8, it is also possible to shut off the separator, and thus carry out the withdrawl and cleaning operation intermittently, operating the separator only for certain periods of time, at spaced intervals. Normally, however, it is desired to carry out the withdrawal and cleaning operations continuously throughout the pulping process, from the time that the withdrawal is begun.

It may be necessary to shut down operation of the separator 7 in the course of the process for cleaning. In this event, valves (not shown) in lines 6 and 8 are closed.

When the batchwise system shown in FIG. 1 is utilized for a sulfate pulping process, for example, in the production of birch sulfate pulp, the fresh pulping liquor normally is a mixture of pulping waste liquor and white liquor. The waste pulping liquor may be passed through the separator 7 before preparing fresh pulping liquor.

In the preparation of sulfate pulping liquor and also other pulping liquors, the diluting liquid used may also be waste water that has been taken, for example, from a screening or bleaching section, and passed through the separator 7 for cleaning, before combining with the pulping liquor.

FIG. 2 shows application of the process of the invention to a continuous sulfate pulping process. Wood in the form of chips is fed through the conduit 17 into the pre-impregnation vessel 19, together with white liquor fed in through the conduit 18. The chips and the cooking liquor are mixed, and the initial pulping reactions take place in the vessel 19.

The mixture of chips and pulping liquor is removed from the bottom of the vessel through the feeder 20, and passed through the conduit 21 to the upper part 22 of the digester. This transport is done with the aid of pulping liquor withdrawn from the upper part 22 of the digester and recycled to the feeder 20, but this recycle feed line is not shown in FIG. 2. Steam is introduced into the top of the digester through the conduit 23, and the mixture of chips, pulping liquor and steam then proceeds downwardly through the digester as the pulping reactions begin. The pulping continues through the zone 24.

Arranged about the outer periphery of the digester is a screen 25, through which a given quantity of pulping liquor can be withdrawn via line 26, and fed to the separator 27, for separating high molecular weight substances from the pulping liquor. The permeate, the pulping liquor freed from the high molecular weight substances, passes through line 28 to the heat exchanger 29. Energy required to raise the temperature of the pulping liquor to the pulping temperature is provided in the form of steam through the conduit 30, and excess steam and steam condensate are removed from the conduit 31.

The concentrate, the high molecular weight substances which remain before the membrane in the separator 27, is withdrawn through the conduit 32, and passed, for example, to the evaporator plant and soda recovery unit for combustion. The reheated pulping liquor is returned to the digester through the conduit 33, which extends down through the center of the digester to a level with the screen 25.

The pulping of the wood chips continues while the mixture of partially digested chips continues to descend through the digester, and is complete at the time the pulp is contacted with washing liquor at the screens 34. At this location, waste pulping liquor is withdrawn, and passed through line 35 to the combusters for recovery of the chemicals content thereof. The partially digested chips are transported through the washing zone 36, where heat is also supplied by extraction liquor withdrawn via the screens 44, and carried through the line 37 to the heat exchanger 38 back to the washing section through the line 39. Energy in the form of steam is supplied to the heat exchanger through the conduit 40, and the steam and steam condensate remaining is removed through the line 41. The conduit 39 extends to the center of the digester and down into the bottom part of the digester at the screens 44.

Dilution and washing liquid is supplied to the bottom of the digester through the lines 42 and 43, and the partially digested wood chips are transported through the feeder 45 and the line 46, and subjected to a drop in pressure, whereupon the chips are defibrated to form cellulose pulp.

It is possible to introduce a branch or shunt line by-passing the separator 27, directly connecting line 26 and line 28. These conduits are then provided with valves which make it possible to completely shut off the separator 27, for cleaning or for intermittent operation. The branch line makes it possible to bypass the separator, and thus pass only a part of the withdrawn pulping liquor through the separator.

At what stage of a continuous pulping the separation of high molecular weight substances needs to take place depends upon the design of the continuous digester. The pulping liquor should be withdrawn at least from the section where the bulk delignification reactions begin, but it can also be withdrawn earlier.

While only one pulping liquor circulation circuit is shown in FIG. 2, digesters which incorporate two such circuits or more can also be employed, and it is also possible to connect the separator 27 to a plurality of continuous digesters.

The separator 27 is preferably included in the upper circulation circuit, if there be more than one circuit. It is also possible to include a separator in the lower circulation circuit as well or only there. It is also possible to withdraw flows of circulating pulping liquor from both of the upper and lower regions of the separator, and pass both to the same separator.

The following Examples in the opinion of the inventors represent preferred embodiments of the invention.

EXAMPLE 1

In this Example, a digester having a volumetric capacity of 30 liters, incorporating a circulation conduit system extending through an electrically heated heating chamber, was employed.

A control pulping was carried out as follows: Pine chips (*Pinus silvestris*) and sulfate pulping liquor were introduced into the digester in a wood/liquor ratio of 1:4. The sulphidity of the pulping liquor was 35%, and the alkali charge was 20% effective alkali (NaOH+$\frac{1}{2}$ Na$_2$S), calculated on the weight of the bone-dry wood. The pulping was started at a temperature of 80° C., and the temperature was increased to 150° C. at a rate of 1° C. per minute during the initial stage of the cook. The bulk delignification reactions began at 150° C., and the temperature of the cook was then raised from 150° C. to the maximum temperature of 170° C., at a rate of 0.2° C. per minute, and held at 170° C. for 35 minutes, to a total cooking time of 205 minutes. Thus, the bulk delignification was carried out at from about 150° to about 170° C. while the initial pulping reactions were carried out at from 80° C. to about 150° C.

The pulping in accordance with the invention was carried out in exactly the same way, but with the exception that 10 liters of pulping liquor was removed after 70 minutes, 160 minutes and 195 minutes pulping, calculated from the beginning of the pulping at 80° C., and replaced with pulping liquor which had been freed from high molecular weight substances having a molecular weight in excess of 10,000. These pulping liquors that were circulated to the digester at these times were taken from a continuous sulfate digester of the type illustrated in FIG. 2, at the following locations:

(a) pulp liquor which transports chips from the pre-impregnation vessel to the digester at conduit 21;

(b) pulping liquor in the recirculation conduit (the conduit 26); and (c) pulping liquor at the end of the pulping from the conduit 35.

Samples of these pulping liquors were taken in vessels and transported to the site of an ultrafiltration unit constructed on a pilot plant scale. The plant comprised a storage vessel for untreated pulping liquor; filters for extracting high molecular weight substances from the pulping liquor; conduits; pumps; and tube modules incorporating ultrafiltration membranes. The tube modules were manufactured by Paterson Candy International (England). The cut-off value for one module (maximum molecular weight not passing through the membrane) was 50,000, and for the other membrane 100,000. This means that substances of higher molecular weight than these are not capable of passing through the membrane. In practice, however, these membranes extract the major part of the substances which have a molecular weight as low as 10,000, and also a part of the substances which have a still lower molecular weight, because the membrane becomes coated with material after being in use for some time. The extractability of the filters was also found to be contingent on temperature. The membranes produced a good result at a pulping liquor temperature of at least 70° C.

In this treatment of the three pulping liquor samples, the pulping liquor was charged to the vessel, and the pulping liquor circulation started. The pulping liquor then circulated through pre-filters and tube modules, and back to the storage vessel. This circulation was continued for about two hours, while maintaining the temperature at about 70° C., to produce a coating on the membrane. After circulating the liquor for two hours, the permeate was recovered, constituting pulping liquor free from the major part of substances having a molecular weight above 10,000. 10 liters of respective cooking liquors treated in this manner were charged to the digester at the pulping time indicated, in replacement of 10 liters of pulping liquor taken from the digester. The following results were obtained:

TABLE I

| Pulp property | Control | Example 1 |
|---|---|---|
| Kappa number, SCAN-C 1:59 | 35.3 | 34.5 |
| Viscosity, dm³/kg, SCAN-C 15:62 | 1191 | 1263 |
| Yield, % of wood charged | 47.4 | 47.3 |

It is apparent from the data in Table I that the pulp of Example 1 produced in accordance with the invention had a lower Kappa number and a higher viscosity than the control pulp. Despite a lower Kappa number of 0.8 unit, the pulp yield produced in accordance with the invention was only 0.1% lower than that of the reference pulp.

EXAMPLE 2

A sulfite pulping was carried out using industrial spruce chips (*Picea abies*) and pulping liquor obtained from a sulfite pulp mill. The chips and pulping liquor were charged to a digester having a capacity of 25 liters, and incorporating a circulation conduit system passing through an electrically heated chamber. The chips were cooked in two stages. In the first stage, pulping liquor having a pH of 6.3 was charged to the digester, in an amount calculated as $Na_2O$ of 6% by weight of the bone-dry wood. The wood/liquor ratio was 1:4.5 kg per liter. The temperature of the pulping was increased from 80° C. to 145° C. in one hour, and this temperature was maintained for three hours. The first stage was terminated by withdrawing pulp liquor from the chips in an amount to obtain a wood/liquor ratio of 1:2.7 kg per liter.

$SO_2$ water was then fed to the digester until the wood/liquor ratio again reached 1:4.5. The temperature was adjusted to 134° C., and a total pressure of 700 kPa was measured. The intermediate gassing time was 0.5 hour, and the time in the second pulping stage was 5.5 hours.

Then two runs were made in accordance with the process of the invention. In both runs, 5 liters of pulping liquor were removed from the digester after 6.5 hours and 8.5 hours, respectively, from the start of the pulping at 80° C. Pulping liquors was removed at the same location from an industrial digester, and treated in an ultrafiltration separator of a kind similar to that described in Example 1. In one run, the membrane used was capable of extracting the major part of substances having a molecular weight above 7000, whereas the membrane used in the other run extracted the major part of those substances having a molecular weight above 2000. Five liters of pulping liquor were charged in each run as replacements for pulping liquor removed from the digester, at 6.5 hours and 8.5 hours, respectively, from the start of the pulping. The following results were obtained:

TABLE II

| Pulp property | Control | Example 2 A > 7000 | Example 2 B > 2000 |
|---|---|---|---|
| Kappa number, SCAN-C 1:59 | 6.3 | 5.4 | 5.0 |
| Viscosity, dm³/kg, SCAN-C 15:62 | 1050 | 1076 | 1060 |
| Yield, % of wood charged | 52.1 | 52.0 | 51.9 |

It is apparent from the above data that the process according to the invention affords an improved delignification and an improved selectivity, as compared to the control. In Run A, in which the major part of substances having the molecular weight greater than 7000 were removed twice during the pulping, the Kappa number was 0.9 unit lower than the control pulping, while in Run B, in which the major part of substances having a molecular weight greater than 2000 were removed twice during the run, the Kappa number dropped a further 0.4 unit. Despite the fact that the delignification was carried to a greater degree in the runs according to the invention, the pulp viscosity was in fact somewhat higher than that of the control, and the reduction in pulp yield was surprisingly low.

While the working Examples illustrate application of the processes to chemical sulfate pulp and chemical sulfite pulp, the process of the invention is applicable to any pulp prepared by a chemical pulping process, either as a part of one stage, or as the only pulping technique applied. Exemplary chemical pulps to which the invention is applicable include sulfite pulp, sulfate pulp, polysulphide pulp, soda pulp, pulps prepared by the reaction of oxygen and alkali on the lignocellulosic material and pulps in which a chemical pulping constitutes only one stage of the production process, such as chemimechanical and semichemical pulp.

Having regard to the foregoing disclosure, the following is claimed as the inventive and patentable embodiments thereof:

1. A process for preparing cellulose pulp by delignification of lignocellulosic material, which comprises:
    (1) subjecting particulate lignocellulosic material in a pulping zone to the pulping action of a pulping liquor at a temperature at which pulping reactions leading to formation of cellulose pulp proceed, and substances having a molecular weight above about 3500 are removed from the lignocellulosic material and become dispersed in the pulping liquor;
    (2) in the course of the pulping of step (1) withdrawing pulping liquor containing such dispersed substances from the pulping zone, and physically separating and removing such dispersed substances therefrom; and
    (3) returning pulping liquor having a substantially reduced content of such dispersed substances to the pulping zone for further pulping.

2. A process according to claim 1 in which the pulping liquor is withdrawn continuously throughout the pulping of step (1).

3. A process according to claim 1 in which the pulping liquor is withdrawn from the pulping zone from time to time.

4. A process according to claim 1 in which the lignocellulosic material is wood chips.

5. A process according to claim 1 in which the pulping liquor is sulfite pulping liquor.

6. A process according to claim 1 in which the pulping liquor is sulfate pulping liquor.

7. A process according to claim 1 in which the pulping zone of step (1) is a continuous pulping zone.

8. A process according to claim 1 in which the pulping zone of step (1) is a batch pulping zone.

9. A process according to claim 1 in which the withdrawing of pulping liquor is begun after completion of initial pulping reactions in step (1).

10. A process according to claim 1 in which the withdrawal of pulping liquor continues at a rate sufficient to maintain a low concentration in the pulping liquor of the high molecular weight substances.

11. A process according to claim 1 in which substances having a molecular weight above about 2000 are removed.

12. A process according to claim 1 in which substances having a molecular weight above about 1500 are removed.

13. A process according to claim 1 in which the high molecular weight substances are removed by ultrafiltration.

14. A process according to claim 1 in which the high molecular weight substances are removed by reverse osmosis.

15. A process according to claim 1 in which the concentration of high molecular weight substances in the pulping liquor in the pulping zone is maintained at below about 8% by weight of the pulping liquor.

16. A process according to claim 1 in which the concentration of high molecular weight substances in the pulping liquor in the pulping zone is maintained at below about 5% by weight of the pulping liquor.

17. A process according to claim 1 in which the concentration of high molecular weight substances in the pulping liquor in the pulping zone is maintained within the range from about 0.5 to about 2.5% by weight of the pulping liquor.

* * * * *